United States Patent [19]

Helmuth

[11] E Re. 31,486

[45] Reissued Jan. 3, 1984

[54] RAPID STARTING OF GAS DISCHARGE LAMPS

[75] Inventor: James G. Helmuth, Monrovia, Calif.

[73] Assignee: Chadwick-Helmuth Company, Inc., El Monte, Calif.

[21] Appl. No.: 380,074

[22] Filed: May 20, 1982

Related U.S. Patent Documents

Reissue of:

[64] Patent No.: 3,944,876
Issued: Mar. 16, 1976
Appl. No.: 510,440
Filed: Sep. 30, 1974

[51] Int. Cl.[3] ..... H05B 41/16; H05B 41/24

[52] U.S. Cl. ..... 315/205; 315/273; 315/276; 315/289; 315/DIG. 7

[58] Field of Search ..... 315/DIG. 2, DIG. 5, 315/DIG. 7, 205, 207, 208, 273, 274, 275, 276, 289

[56] References Cited

U.S. PATENT DOCUMENTS

| | | | |
|---|---|---|---|
| 3,466,500 | 9/1969 | Peer | 315/100 |
| 3,476,977 | 11/1969 | Hallay | 315/183 |
| 3,519,879 | 7/1970 | Ogawa | 315/151 |
| 3,522,475 | 4/1970 | Hashimoto | 315/239 |
| 3,544,839 | 12/1970 | Fahnrich | 315/200 |
| 3,626,243 | 12/1971 | Koyama | 315/101 |
| 3,649,869 | 3/1972 | Nomura | 315/205 |
| 3,659,146 | 4/1972 | Munson | 315/92 |
| 3,681,653 | 8/1972 | Snyder | 315/106 |
| 3,699,385 | 10/1972 | Paget | 315/239 |
| 3,758,818 | 9/1973 | Kaneda | 315/207 |
| 3,866,088 | 2/1975 | Kaneda | 315/105 |
| 4,339,692 | 7/1982 | Lasecki et al. | 315/277 |
| 4,356,433 | 10/1982 | Linden | 315/308 |

FOREIGN PATENT DOCUMENTS

| | | |
|---|---|---|
| 1037008 | 2/1959 | Fed. Rep. of Germany . |
| 1764645 | 12/1972 | Fed. Rep. of Germany . |
| 1589306 | 3/1973 | Fed. Rep. of Germany . |
| 47-10920 | 6/1972 | Japan . |
| 47-41876 | 10/1972 | Japan . |
| 47-39334 | 11/1972 | Japan . |
| 49-275 | 1/1974 | Japan . |
| 49-61965 | 6/1974 | Japan . |
| 1065310 | 4/1967 | United Kingdom . |
| 1183542 | 3/1970 | United Kingdom . |
| 1210153 | 10/1970 | United Kingdom . |
| 1222699 | 2/1971 | United Kingdom . |

*Primary Examiner*—Palmer C. Demeo
*Attorney, Agent, or Firm*—William W. Haefliger

[57] ABSTRACT

A starting device for a gas discharge lamp, to whose electrodes AC voltage is applied, comprises:

a. first means electrically connected with at least one lamp electrode to apply to the lamp a transient voltage pulse which initially changes in amplitude in a polarity direction relatively in opposition to the polarity of the main voltage simultaneously supplied to the electrodes, b. said first means including circuitry to cause said pulse to thereafter change in amplitude in a polarity direction in aid of the polarity of the main voltage simultaneously supplied to the electrodes.

14 Claims, 7 Drawing Figures

RAPID STARTING OF GAS DISCHARGE LAMPS

Matter enclosed in heavy brackets [ ] appears in the original patent but forms no part of this reissue specification; matter printed in italics indicates the additions made by reissue.

BACKGROUND OF THE INVENTION

This invention relates generally to the starting of gas discharge lamps, and more particularly concerns overcoming problems relating to such starting.

Gas discharge lamps such as mercury vapor lamps have come into widespread use, two examples being sources of ultraviolet light employed in print reproduction, and street lamps. Although such lamps are clean and efficient devices, as compared with carbon arc lights, they have presented two long standing problems. First, they require objectionably long warm-up times, i.e up to about 5 minutes in certain cases; and secondly, there is the practical impossibility of re-starting a warmed-up mercury vapor lamp (should it be even momentarily turned off) until it cools. Therefore, for repetitive on-off duty, it has been the practice to leave the lamp on all the time, and resort to a mechanical shutter which is moved to control exposure. Such shutters, however, are subject to mechanical failure, and resultant prolonged human exposure to a mercury vapor lamp in ON condition can cause serious damage to the eyes and skin.

SUMMARY OF THE INVENTION

It is a major object of the invention to overcome both of the above problems, enabling powering of gas lamps only when needed and thereby additionally producing energy savings, extension of lamp life and elimination of physical damage to humans otherwise resulting from prolonged exposure to lamp rays. Further, mercury vapor lamps used as street lights can be restarted immediately after power interruptions (as for example may be due to lightning, and short power failures), enhancing traffic and pedestrian safety.

Basically, the starting device comprises means to apply to the lamp one or more transient voltage pulses or spikes which initially change in amplitude in a polarity direction relatively in opposition to the polarity of the main voltage simultaneously supplied to the electrodes; further, each pulse thereafter is typically caused to change in amplitude in a polarity direction in aid of the polarity of the main voltage then being applied to the electrodes. As a result, a rapid start of the lamp is achieved.

It is another object of the invention to provide circuitry to achieve the above; with pulse oscillation frequency much greater than the main AC voltage frequency. Such circuitry may typically include series connected inductance and capacitance, and control means electrically connected with the capacitance to effect capacitor discharge and pulse production in response to predetermined increase or decrease in the amplitude level of the main AC voltage; accordingly, pulse production may be achieved when the main AC voltage is near maximum absolute value, to aid the start; also, when the main AC voltage drops below that level, the command of pulse production is terminated.

It is a further object of the invention to provide second means to produce ionization of the gas within the lamp during application of voltage pulses to the lamp electrodes, such second means typically including an ion gun, and other circuitry including inductance and capacitance to apply an auxiliary voltage pulse to the gun in synchronism with pulse application to the lamp electrodes.

It is an additional object of the invention to provide unusually effective ballast circuitry between the main AC source and the lamp, such ballast shortening the time from start to full light out, without drawing excessive current from the mains and without applying excessive power to the lamp.

These and other objects and advantages of the invention, as well as the details of illustrative embodiments, will be more fully understood from the following description and drawings, in which:

DRAWING DESCRIPTION

DETAILED DESCRIPTION

Figure 1:
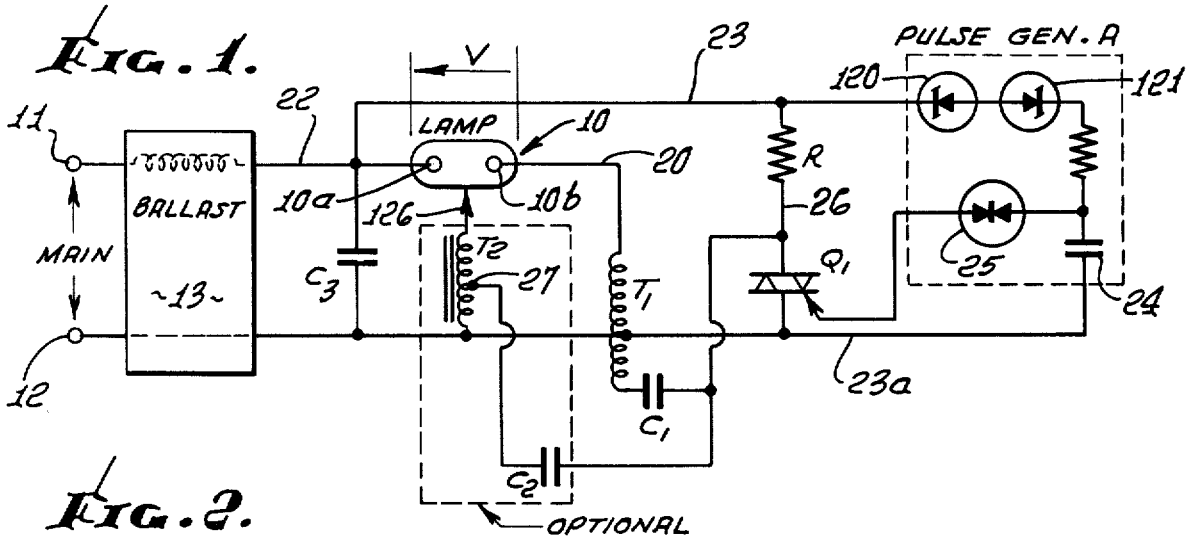
FIG. 1 is a circuit diagram.
Figure 2:
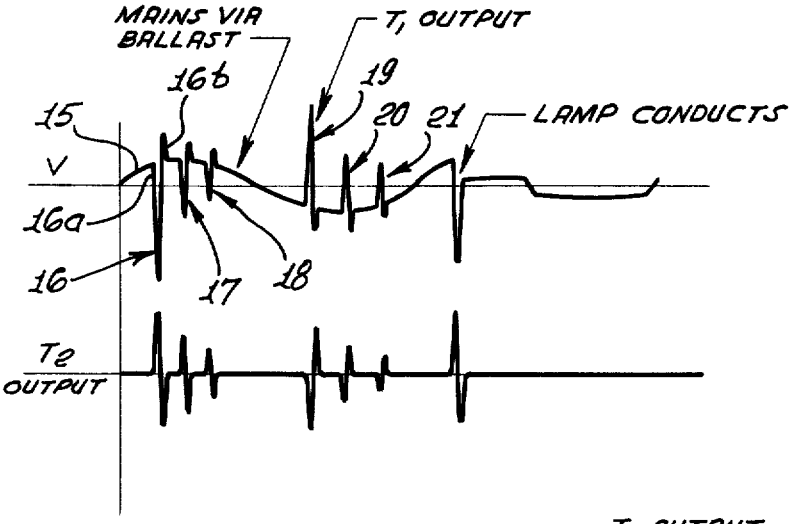
FIGS. 2 and 3 are wave forms related to the operation of the FIG. 1 circuit.

Referring first to FIG. 1, it illustrated one preferred form of starting device for a discharge lamp 10 to which main AC voltage is supplied via input terminals 11 and 12, ballast 13, and lamp electrodes 10a and 10b. The main AC voltage waveform appears at 15 in FIGS. 2 and 3.

Figure 3:
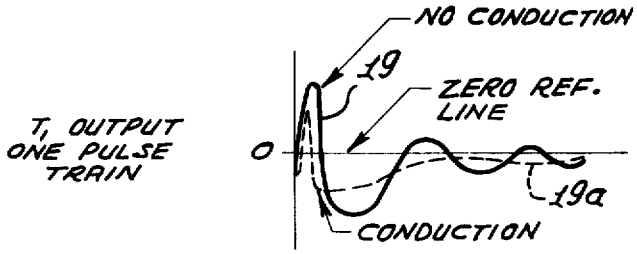

In accordance with the invention, first means is electrically connected with at least one lamp electrode to apply to the lamp a transient voltage pulse which initially changes in amplitude in a polarity direction relatively in opposition to the polarity of the main voltage 15 simultaneously supplied to the electrodes. See for example the sharp initial amplitude change at 16a of pulse 16 in FIG. 2, the pulse being applied at 20 to electrode 10b in FIG. 1. Further, the pulse is thereafter caused to change in amplitude in a polarity direction in aid of the polarity of the main voltage 15. See for example the sharp amplitude change at 16b of pulse 16 in FIG. 2, it being clear that the pulse oscillation frequency is much greater than the frequency of the main AC voltage. One or more such pulses are typically applied, as for example at 16, 17 and 18 during one half cycle of the main voltage wave; further, pulses 19, 20 and 21 are shown as applied during the next half cycle, the latter pulses being reversed in initial amplitude change direction relative to pulses 16–18. A time axis expanded version of pulse 19 is shown in FIG. 3, the shape of the pulse being altered as shown by the broken lines 19a upon the occurrence of lamp conduction.

In the circuitry example as shown in FIG. 1, the means to produce the pulses typically includes series connected capacitance $C_3$ and inductance $T_1$ characterized as causing the pulse to have the illustrated transient wave form. Further, control means is connected with such circuitry to effect pulse production in response to predetermined change in amplitude of the main AC voltage, as during each half cycle of the latter. Such control means may with unusual advantage include Zener diode means as at 120 and 121 connected back-to-back and in series with the ballast 13, as via leads 22 and 23. The Zener diodes are also connected in series with capacitance 24, via diode 25, so that the capacitance 24 will become charged when the Zeners conduct in response to increase of the main voltage to predetermined level, on each half cycle. When the capacitance charges to predetermined voltage level, the diode 25 conducts, firing the triac $Q_1$.

Upon conduction of the latter via path 26 between main power heads 23 and 23a, the capacitor $C_1$ is discharged through the primary of the pulse transformer $T_1$. The latter may typically produce a medium voltage pulse (7–15 KV, for example) applied, as described, across the lamp electrodes ($C_3$ being low impedance to the pulse). The energy of one pulse is normally insufficient to establish full conduction in the arc region of the lamp, reliance being placed on a succession of such places (as at 16–18) superposed on the main voltage to alter the ionization state of the gas within the lamp, and free charges, thereby to initiate lamp conduction. When the lamp conducts, the voltage at lead 22 falls, disabling the pulse generator A that includes elements 120, 121, 24 and 25 previously described. Should the lamp ever stop conducting while main power is applied, the starting cycle will automatically repeat.

With respect to the connection of $T_1$ to oppose the main voltage, it would normally appear that such a connection is incorrect. It is found, in this regard, that after $T_1$ delivers an initial pulse, conduction ceases momentarily but, within the lamp, due to the reverse conduction in oppsitions to main voltage, a condition is brought into existance which aids the main voltage. While the exact nature of such condition is not understood, it is thought that the reverse current within the lamp creates a cloud of electrons produced by secondary emission at the electrode which then becomes the cathode for the main current flow.

Also provided is what may be referred to as second means to produce ionization of gas within the lamp during application of the voltage pulse to the lamp electrode by transformer $T_1$. Such second means may with unusual advantage include an ion gun 126, and other circuitry to apply an auxiliary voltage pulse to the gun. For example, that circuitry may include a transformer $T_2$ whose end taps are connected between the gun and lead 23a, $T_2$ having an intermediate tap 27 connected via a capacitor $C_2$ and resistor R with lead 23. When the triac $Q_1$ is fired as described, the capacitor $C_2$ is discharged through the primary of $T_2$, which causes $T_2$ to produce a relatively very high voltage (i.e., 15–20 KV) pulse at relatively low current applied to the gun. This produced ionization of the gas in the Townsend region in the gun; however, the ionization level is not sufficient (if the lamp is hot and the mercury is vaporized, as in a Sylvania type H377 lamp, for example) to enable the main voltage to cause conduction. On the other hand, such ionization assists the lower voltage from $T_1$ to cause reverse current flow, allowing the relatively very low voltage from the mains, plus the second cycle of $T_1$ output, to cause forward current to bring the lamp into full conduction. Typically, the ionization level will be sufficient for $T_1$ voltage to cause high reverse current (0.5 to 2 amps) to flow for a short time (5–20$\mu$ second, for example) in the lamp.

If $T_2$ is not employed, the voltage level from $T_1$ must be higher in order to first ionized the gas and then to produce the reverse current, as described above. It should also be noted that if $T_1$ is connected with conventional polarity so as to aid the main voltage, and/or if $T_1$ does not produce a second oscillatory pulse after the initial pulse (i.e. a second pulse such as 17 after initial pulse 16, for example), very much more energy is required from $T_1$ to bring the lamp into main conduction.

An ion gun of the type referred to is described in my prior application Ser. No. 371,396, filed June 19, 1973, now U.S. Pat. No. 3,870,924.

Figure 4:
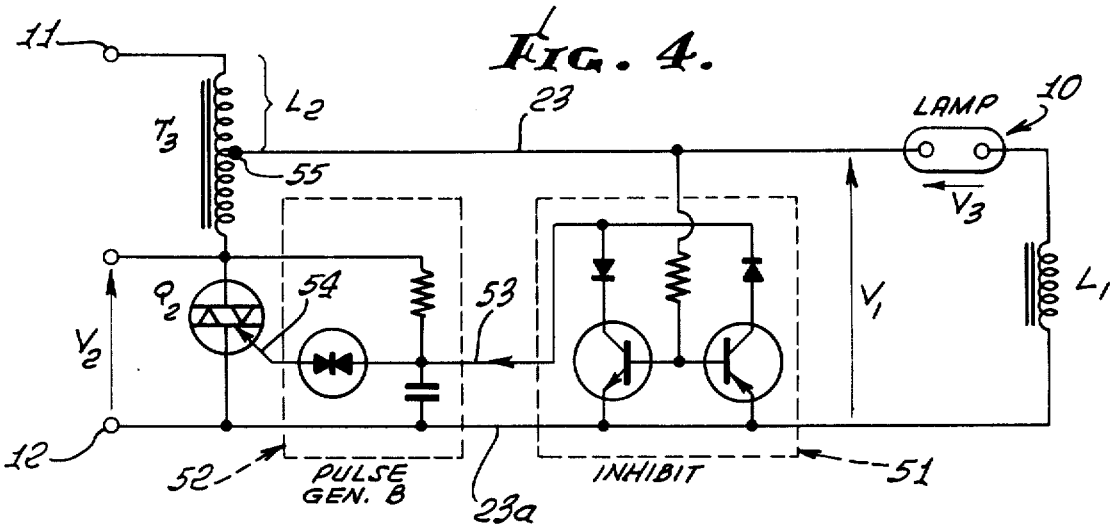
FIG. 4 is a circuit diagram.

Referring now to FIG. 4, improved ballast circuitry is shown in combination with lamp 10, which is of the medium to high pressure type, such as the Sylvania Model previously referred to. Such ballast shortens the time (i.e. from 3–5 minutes as in conventional to only a few seconds, i.e. 15 seconds for example) from start to full light out without drawing excessive current from the mains and without applying excessive power to the lamp.

The circuit essentially comprises an autotransformer $T_3$ and a gate controlled bilaterally conductive device such as triac $Q_2$ connected in series between the mains 11 and 12; an inhibit circuit 51 connected between leads 23 and 23a; and a pulse generator 52 responsive to the output at 53 of the inhibit circuit to control firing of the triac, as shown. Note that the pulse generator output is connected to the triac gate at 54.

Figure 5:
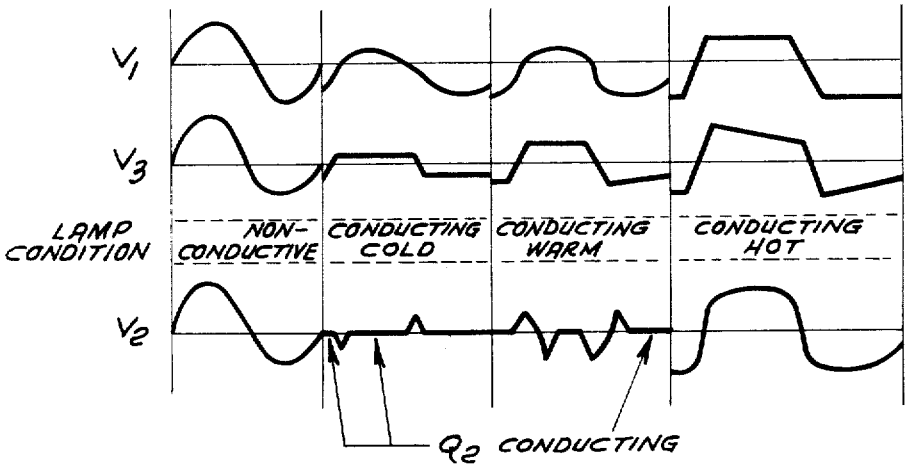
FIGS. 5 and 6 are wave forms related to the operation of the FIG. 4 circuit.
Figure 6:
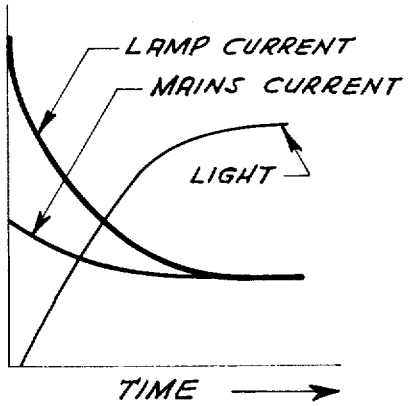

In operation, when power is applied to the cold lamp 10 which is non-conductive, the voltages $V_1$ and $V_2$ as indicated are essentially the same as at the mains, (i.e. 240 VAC, for example) as is clear from FIG. 5, and there is no voltage change across $T_3$. Therefore, $V_2$ across Q2 has the same phase and amplitude as $V_1$. The latter commands the inhibit circuit which prevents the pulse generator from operation when its $V_2$ command has the same phase as $V_3$. Therefore, $Q_2$ does not conduct, and full supply voltage remains applied to the lamp to assist starting.

When the cold lamp conducts via the exciting inductance $L_2$,(typically at about 70 MH), $V_1$ becomes low due to the small voltage drop across the lamp (i.e. 20 volts, for example), and there is then a large voltage gradient along $T_3$. This causes $V_2$ to tend to be of opposite phase from $V_1$. The inhibit circuit then no longer prevents the pulse generator from operating, and $Q_2$ conducts. $T_3$ can now operate as an autotransformer, delivering high currents (e.g. 30 AMPS, for example) to the lamp while drawing much less current (e.g. 14 amps) from the main. The ratio of these two currents is determined by the position of the tap 55 (e.g. 40% for example) and the magnitude determined by the inductance of $L_1$ (e.g. 8 MH) and the voltage drop across the lamp. As the lamp warms, voltage across the lamp increases leaving less voltage across $L_2$. Thus, the lamp current decreases.

When the voltage $V_1$ increases sufficiently, $Q_2$ will not conduct at the beginning of each half cycle of lamp current; voltage $V_1$ lags the main voltage since, when $O_2$ is off, current is supplied by the exciting inductance $L_2$ and the lamp voltage is in phase with this lamp current. Thus, voltage $V_2$ will be of the same polarity as $V_1$ and $Q_2$ not triggered until the main voltage is at high enough value during the half cycle to drive $V_2$ to reverse polarity. Then triac $Q_2$ conducts for the remainder of the half cycle. This action continues until $Q_2$ no longer conducts at any time, and the lamp is powered directly from the mains via the leakage inductance $L_2$.

Benefits of this system over prior ballasts include rapid warm-up without excessive mains current; approximate constant power to the lamp during warm-up: since lamp current and lamp voltage are inversely related, this prevents thermal shock or other damage to the lamp due to excessive power input; independence of changes in lamp parameters or line voltage; since circuit action demands that sufficient voltage (up to the maximum available from the mains) is applied to the lamp to maintain conduction, no adjustments need be made for lamp aging, installation of new lamps, normal changes in mains voltage, etc.; and reversible action; i.e. should the lamp for some reason cool, appropriate higher current will automatically be provided to return lamp quickly to full output conditions.

Figure 7:
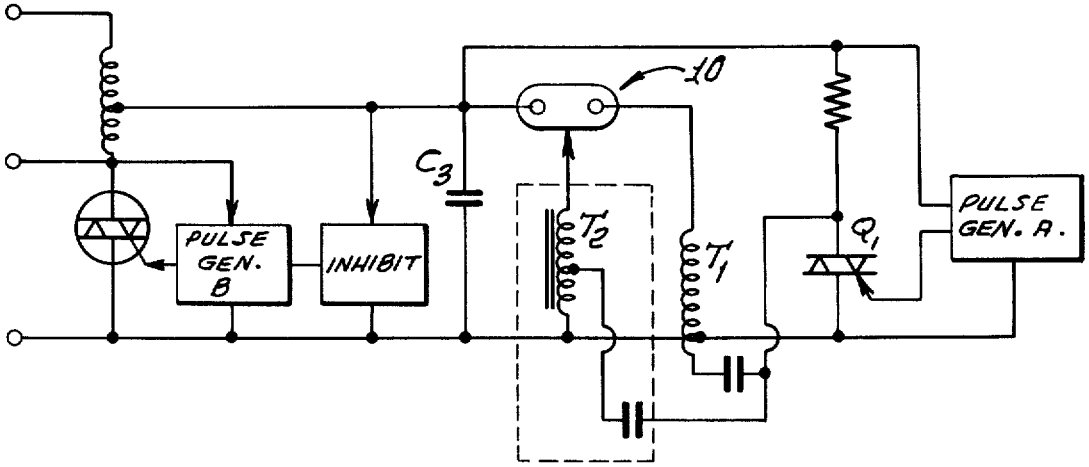
FIG. 7 is a circuit diagram.

FIG. 7 combines the circuits of FIGS. 1 and 4, with all the benefits of each, into a superior lamp starting circuit. Note that $L_1$ of FIG. 4 has been included into $T_1$ of FIG. 1 by adjusting $T_1$ for the desired exciting inductance.

The invention is applicable to mercury and/or metal additive mercury lamps, an example of the latter being Sylvania Type MP2000. In this case, the $T_1$ voltage applicable to the lamp electrodes would be in the range 15KV to 30KV, to hot re-strike, the ion gun also being usable.

I claim:

1. In a starting device for a gas discharge lamp to which main AC voltage is supplied via lamp electrodes,
   a. first means electrically connected with at least one lamp electrode to apply to the lamp a *succession of transient voltage pulses of declining amplitudes* [transient voltage pulse] which initially [changes] *change* in amplitude in a polarity direction relatively in opposition to the polarity of the main voltage simultaneously supplied to *at least one of* the electrodes,
   b. said first means including circuitry to cause said [pulse] *pulses* to thereafter change in amplitude in a polarity direction in aid of the polarity of the main voltage simultaneously supplied to *at least one of* the electrodes, whereby the lamp may be re-started when hot.

2. The device of claim 1 wherein said circuitry includes series connected capacitance and inductance characterized as causing said pulse to have a transient wave form, of a frequency substantially higher than the frequency of said main AC voltage.

3. The device of claim 2 including control means connected with said circuitry, to effect pulse production in response to predetermined change in amplitude of said main AC voltage.

4. The device of claim 3 wherein said control means includes zener diode means connected with at least one of said lamp electrodes, capacitance connected in series with said zener diode means to charge when the zener diode means conducts, and elements to discharge said capacitance when the voltage thereon reaches a predetermined level.

5. The device of claim 1 including second means to produce ionization of gas within the lamp during application of said voltage pulse to the lamp electrode.

6. In a starting device for a gas discharge lamp to which main AC voltage is supplied via lamp electrodes,
   a. first means electrically connected with at least one lamp electrode to apply to the lamp a transient voltage pulse which initially changes in amplitude in a polarity direction relatively in opposition to the polarity of the main voltage simultaneously supplied to the electrodes,
   b. said first means including circuitry to cause said pulse to thereafter change in amplitude in a polarity direction in aid of the polarity of the main voltage simultaneously supplied to the electrodes, whereby the lamp may be re-started when hot,
   c. and second means to produce ionization of gas within the lamp during application of said voltage pulse to the lamp electrode, said second means including an ion gun at the exterior of the lamp and proximate thereto, and other circuitry to apply an auxiliary multi-kilovolt pulse to the gun.

7. In a starting device for a gas discharge lamp to which main AC voltage is supplied via lamp electrodes,
   a. first means electrically connected with at least one lamp electrode to apply to the lamp a transient voltage pulse which initially changes in amplitude in a polarity direction relatively in opposition to the polarity of the main voltage simultaneously supplied to the electrodes,
   b. said first means including circuitry to cause said pulse to thereafter change in amplitude in a polarity direction in aid of the polarity of the main voltage simultaneously supplied to the electrodes,
   c. and second means to produce ionization of gas within the lamp during application of said voltage pulse to the lamp electrode, said second means including an ion gun, and other circuitry to apply an auxiliary voltage pulse to the gun, said other circuitry including a transformer $T_2$ connected with said gun and also having an intermediate tap, capacitance connected between said tap and the main voltage input to the lamp, and there being means to suddenly discharge said capacitor to approximately coincide with said application of said voltage pulse to the lamp electrode.

8. In a starting device for a gas discharge lamp to which main AC voltage is supplied via lamp electrodes,
   a. first means electrically connected with at least one lamp electrode to apply to the lamp a transient voltage pulse which initially changes in amplitude in a polarity direction relatively in opposition to the polarity of the main voltage simultaneously supplied to the electrodes,
   b. said first means including circuitry to cause said pulse to thereafter change in amplitude in a polarity direction in aid of the polarity of the main voltage simultaneously supplied to the electrodes, and
   c. ballast circuitry connected between a source of main AC voltage and the lamp, said circuitry including an autotransformer and a gate controlled bilaterally conductive device connected in series between source terminals, the autotransformer having an intermediate tap connected with a lamp electrode.

9. The device of claim 8 including an inhibit circuit connected between said tap and a source terminal to which said bilaterally conductive device is directly connected, and a pulse generator responsive to the output of the inhibit circuit to control the gate of said bilaterally conductive device.

10. For use in combination with a gas discharge lamp to which main AC voltage is supplied, a ballast circuit connected between the AC source and the lamp, the source having terminals, the lamp having two electrodes, said ballast circuit comprising
   a. an autotransformer and a gate controlled bilaterally conductive device connected in series between said source terminals, and
   b. the autotransformer having an intermediate tap connected with one lamp electrode, c. the other lamp electrode being electrically connected with a source terminal to which the bilaterally conductive device is also electrically connected.

11. The ballast of claim 10 including an inhibit circuit connected between said tap and the source terminal to which said bilaterally conductive device is directly connected, and a pulse generator responsive to the output of the inhibit circuit to control the gate of said device.

*12. A starting device for a gas discharge lamp to which a low frequency main AC voltage and a succession of multiple transient ignition voltage oscillations per half wave of higher frequency than that of the main AC voltage and in a polarity direction in aid of and/or in opposition to the polarity of the main voltage are supplied via lamp electrodes, said ignition voltage oscillations being produced in a capacitive inductive oscillatory circuit, characterized in that the oscillatory circuit is connected for the supply of pulses (16), always performing an initial ignition amplitude change (16a) in opposition to the polarity of the main AC voltage (15) and subsequently an ignition amplitude change (16b) in a polarity direction in aid of the polarity of the main AC voltage.*

*13. In a starting device for a gas discharge lamp to which main AC voltage is supplied via lamp electrodes, the combination comprising*

*(a) first means including circuitry and control means and connected with at least one lamp electrode for applying to the lamp transient voltage pulses,*

*(b) said circuitry for generating and applying said transient voltage pulses including series connected capacitance and inductance, said series connected capacitance and inductance being arranged to cause each of the pulses initially changing in amplitude in a polarity direction relatively in opposition to the polarity of the main AC voltage simultaneously supplied to the electrode and thereafter changing in amplitude in a polarity direction in aid of the polarity of the main voltage, said series connected capacitance and inductance defined to generate in each half cycle of the main AC voltage a sequence of transient voltage pulses of declining amplitudes all of which are in a polarity direction relatively in opposition to the polarity of the main voltage simultaneously supplied to the electrodes, the first pulse of said sequence of transient voltage pulses having the largest amplitude, whereby the lamp may be immediately re-started when hot, and*

*(c) said control means connected with said circuitry to effect pulse production in response to a predetermined change in amplitude of said main AC voltage.*

*14. The combination of claim 13 including additional means to produce ionization of gas within the lamp during application of said voltage pulses to the lamp electrode, said additional means including an ion gun at the exterior of the lamp and proximate thereto, and other circuitry to apply an auxiliary multi-kilovolt pulse to the gun.*

* * * * *